(12) United States Patent
Chathoth et al.

(10) Patent No.: US 9,740,338 B2
(45) Date of Patent: Aug. 22, 2017

(54) SYSTEM AND METHODS FOR PROVIDING A THREE-DIMENSIONAL TOUCH SCREEN

(71) Applicant: Ubi interactive inc., Seattle, WA (US)

(72) Inventors: Anup Koyadan Chathoth, Seattle, WA (US); Chao Zhang, Seattle, WA (US)

(73) Assignee: UBi interactive inc., Seattle, WA (US)

( * ) Notice: Subject to any disclaimer, the term of this patent is extended or adjusted under 35 U.S.C. 154(b) by 34 days.

(21) Appl. No.: 14/719,139

(22) Filed: May 21, 2015

(65) Prior Publication Data

US 2015/0338998 A1 Nov. 26, 2015

Related U.S. Application Data

(60) Provisional application No. 62/002,063, filed on May 22, 2014.

(51) Int. Cl.
*G06F 3/042* (2006.01)
*G06F 3/01* (2006.01)
*G06F 3/0488* (2013.01)
*G06F 3/0482* (2013.01)
*H04N 9/31* (2006.01)

(52) U.S. Cl.
CPC ............ *G06F 3/0425* (2013.01); *G06F 3/016* (2013.01); *G06F 3/017* (2013.01); *G06F 3/0482* (2013.01); *G06F 3/0488* (2013.01); *G06F 3/04883* (2013.01); *H04N 9/31* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 5,317,140 A | 5/1994 | Dunthorn | |
| 5,528,263 A | 6/1996 | Platzker et al. | |
| 8,686,943 B1 * | 4/2014 | Rafii | G06F 3/017 345/158 |
| 8,723,789 B1 * | 5/2014 | Rafii | G06F 3/011 345/156 |
| 2003/0132921 A1 | 7/2003 | Torunoglu et al. | |

(Continued)

FOREIGN PATENT DOCUMENTS

| | | |
|---|---|---|
| WO | 2007/107368 | 9/2007 |
| WO | 2011/098496 | 8/2011 |
| WO | 2011/147561 | 12/2011 |

*Primary Examiner* — David D Davis
(74) *Attorney, Agent, or Firm* — Benedict R. Dugan; Lowe Graham Jones PLLC

(57) ABSTRACT

Systems and techniques for providing a three-dimensional touch screen are described. Example systems include a touch screen manager that is configured to display a screen via a display device, such as by projecting on a wall or other surface a screen generated by a computing device, such as a desktop, laptop, or tablet computer. The manager is further configured to receive position information from a sensor that determines the positions of objects, such as the finger or hand of a user, within a three-dimensional space in front of the display surface. The manager then converts the received position information into user interface events, including gestures (e.g., pinch, swipe), mouse-type events (e.g., click, drag), or the like. The user interface events are provided to an application or other module executing on the computing device.

31 Claims, 23 Drawing Sheets

(56) References Cited

U.S. PATENT DOCUMENTS

| | | |
|---|---|---|
| 2003/0174125 A1 | 9/2003 | Torunoglu et al. |
| 2008/0252596 A1* | 10/2008 | Bell ...................... G06F 3/0304 345/156 |
| 2009/0103780 A1* | 4/2009 | Nishihara ............... G06F 3/017 382/103 |
| 2009/0153468 A1 | 6/2009 | Ong et al. |
| 2009/0243968 A1 | 10/2009 | Nakazawa |
| 2009/0316952 A1 | 12/2009 | Ferren et al. |
| 2010/0053151 A1 | 3/2010 | Marti et al. |
| 2011/0243380 A1* | 10/2011 | Forutanpour ........... G06F 3/017 382/103 |
| 2013/0044053 A1* | 2/2013 | Galor ...................... G06F 3/017 345/158 |
| 2013/0147711 A1* | 6/2013 | Njolstad ................. G06F 3/011 345/158 |
| 2013/0265220 A1* | 10/2013 | Fleischmann ........... G06F 3/017 345/156 |
| 2013/0278499 A1* | 10/2013 | Anderson ................. G06F 3/01 345/156 |
| 2013/0283208 A1* | 10/2013 | Bychkov ................. G06F 3/017 715/810 |
| 2013/0321271 A1* | 12/2013 | Bychkov ................. G06F 3/017 345/158 |

* cited by examiner

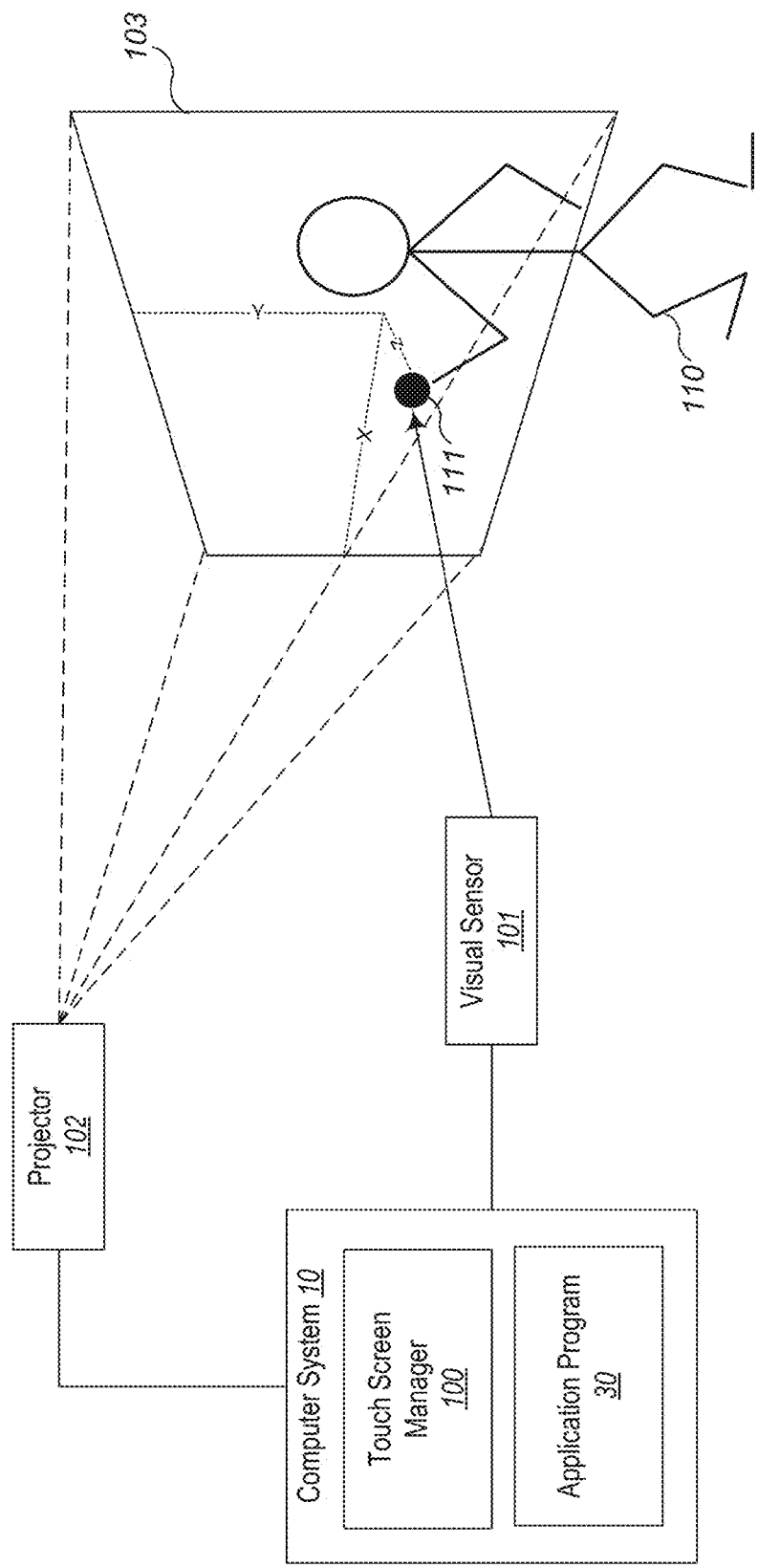

Fig. 3A
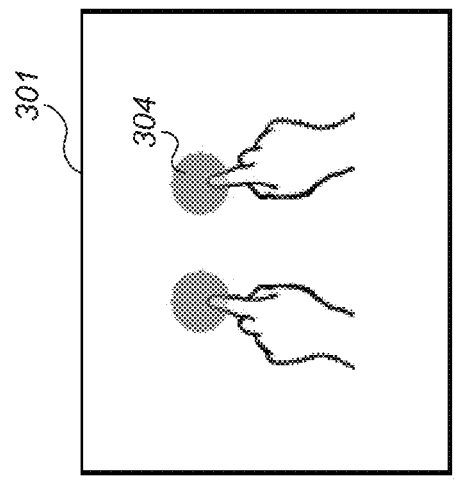
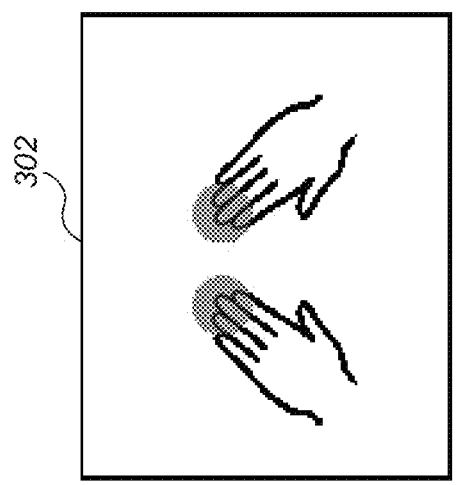
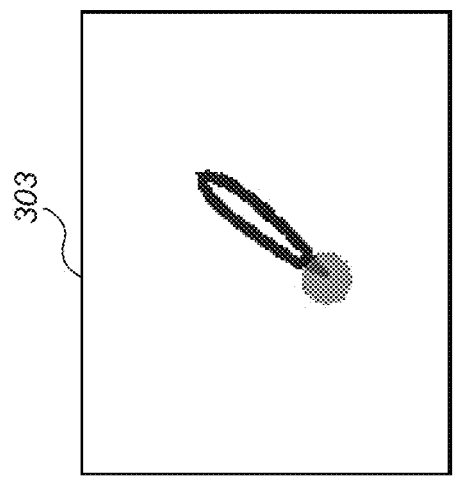

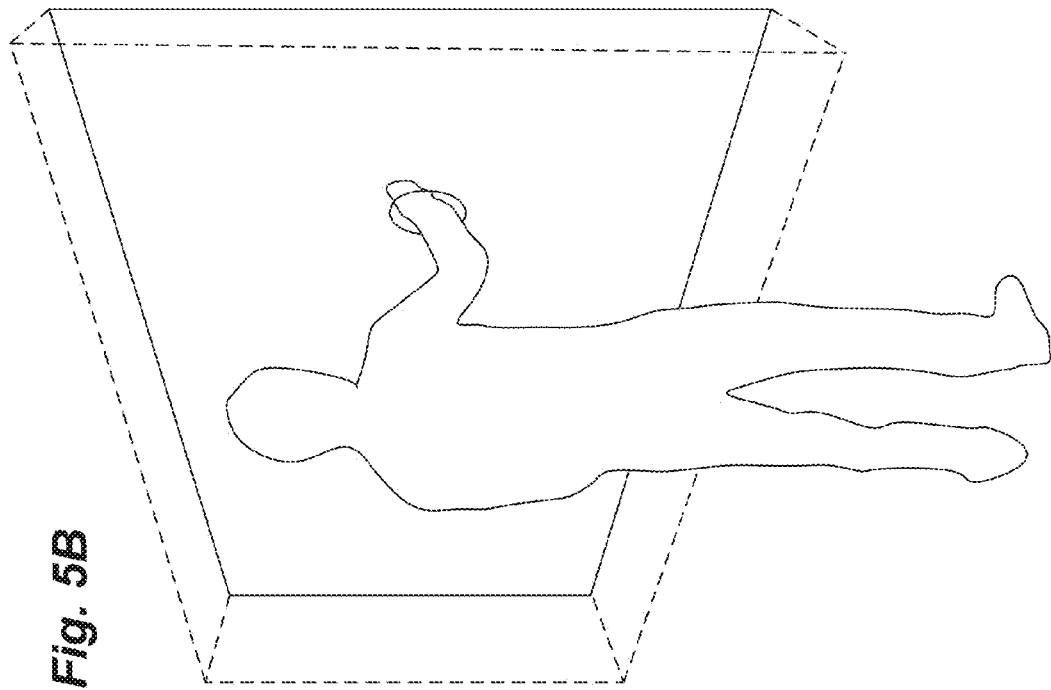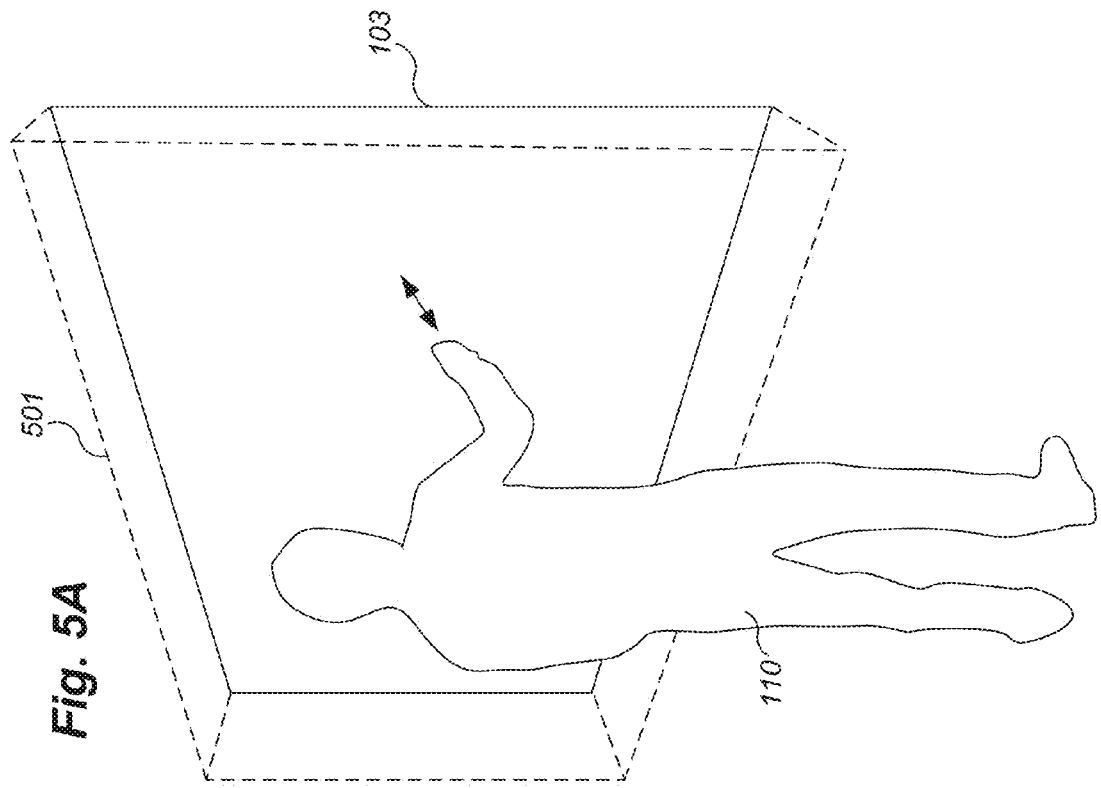

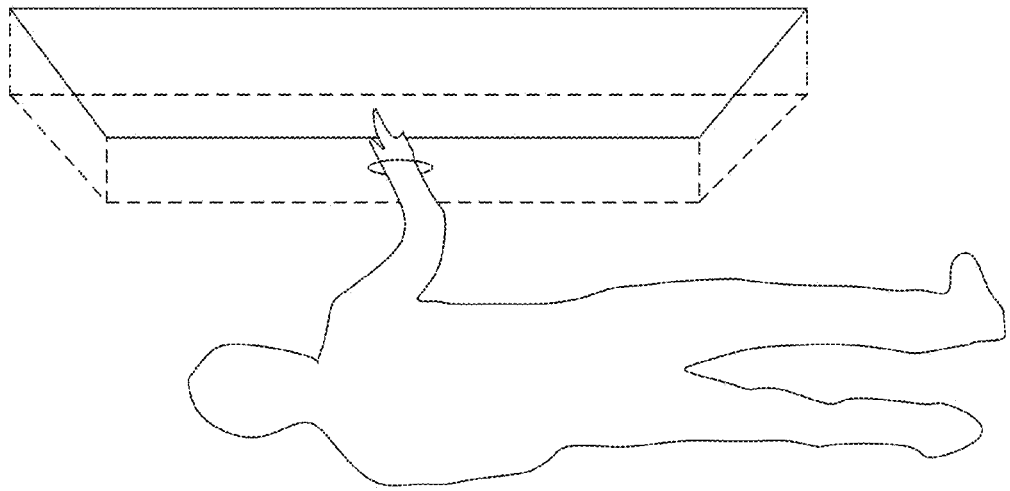
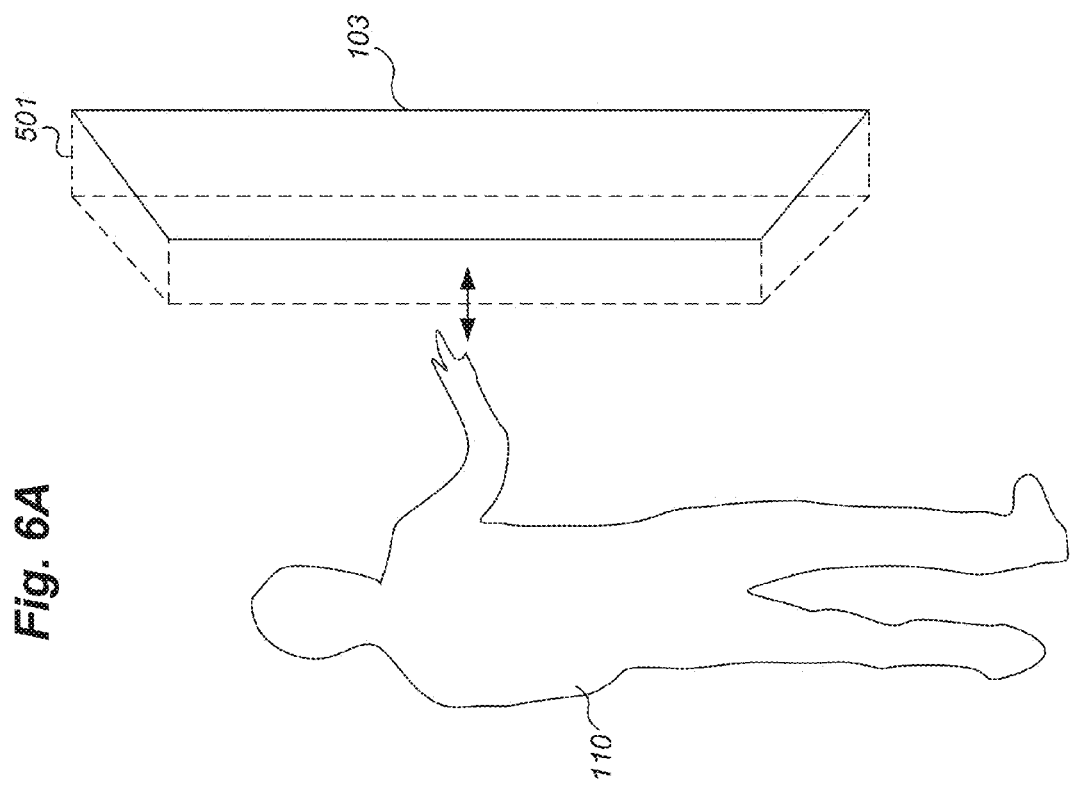

What type of display are you using?

Fig. 7B

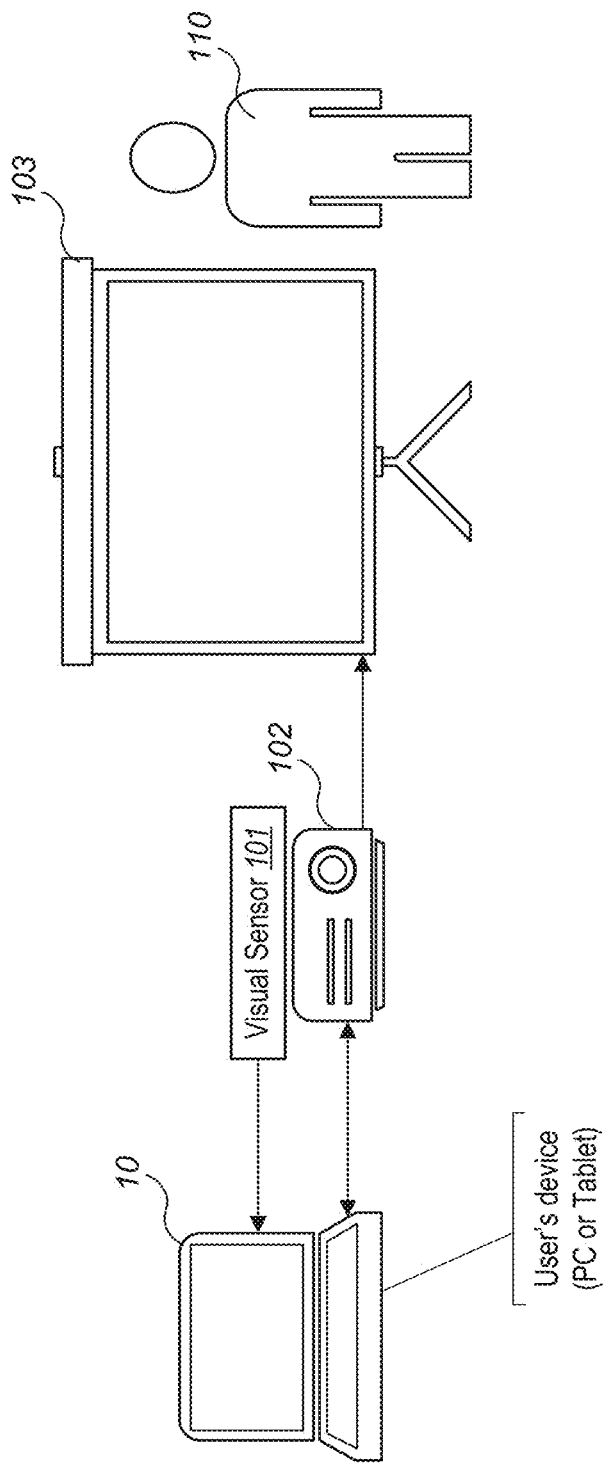

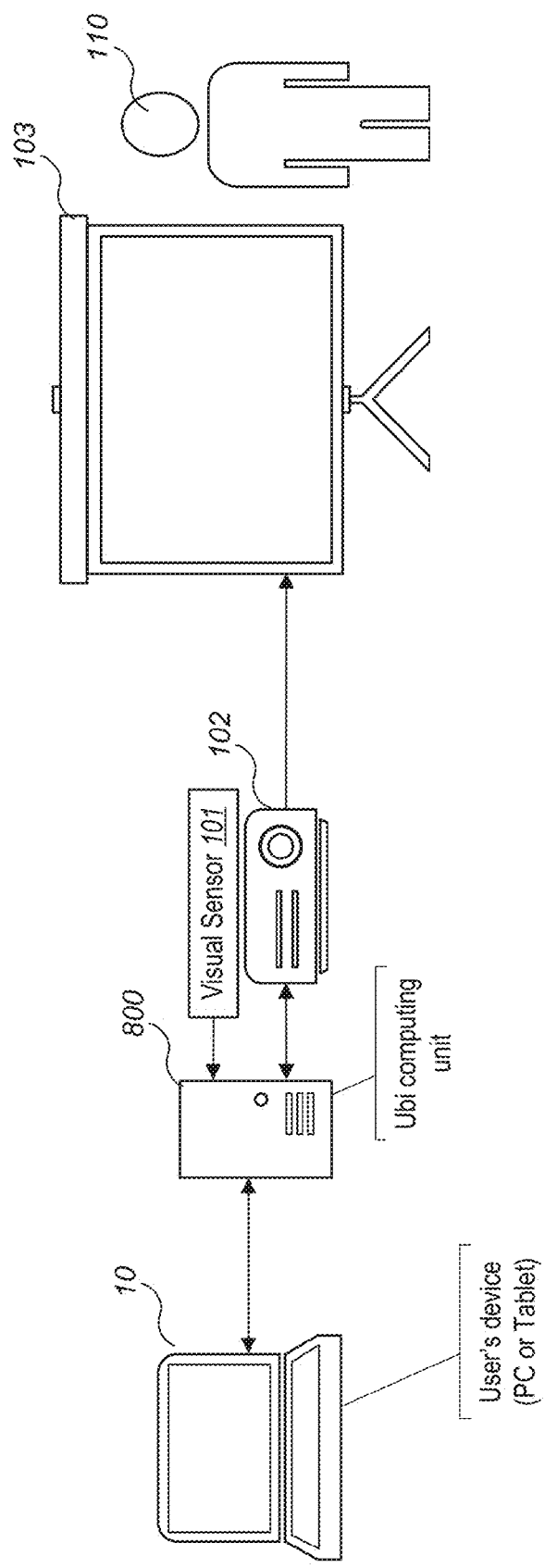

9300: The process of 9100, further comprising:

9301: Presenting a setup user interface

9400: The process of 9100, further comprising:

9401: Calibrating the three-dimensional touch screen

9402: Detecting position and orientation of the displayed screen based on a displayed pattern 9403: Detecting shape, size, and geometry of a surface on which the screen is displayed

Fig. 9E

9500: The process of 9400, wherein the calibrating the three-dimensional touch screen includes:

9501: Determining, based on the position of the visual sensor with respect to its display, that a current physical setup is substantially similar to a previously used physical setup 9502: In response to the detecting, performing auto-calibration without user input and/or skipping calibration and relying on calibration information determined with respect to the previously used physical setup

Fig. 9F

9600: The process of 9100, further comprising:

9601: Automatically selecting an interaction mode

Fig. 9G

9700: The process of 9100, wherein the receiving position information from a visual sensor includes:

9701: Receiving position information that reflects the position of a pen device that includes a light source attached to a pressure sensitive tip, the tip when pressed configured to cause the light source to emit an infrared light signal that is tracked by the visual sensor

Fig. 9H

9800: The process of 9100, further comprising:

9801: Performing displaying a screen by receiving screen data from a first device executes the application program and that is wirelessly coupled to a second device that is performing the method

9802: Performing providing the generated user interface event to an application program by transmitting the generated user interface event to the first device

Fig. 9I

9900: The process of 9100, further comprising:

9901: Determining that a user interface event cannot be generated due to current conditions or action of the user

9902: In response, providing visual or audible feedback to a user to modify the condition or their action

SYSTEM AND METHODS FOR PROVIDING A THREE-DIMENSIONAL TOUCH SCREEN

PRIORITY CLAIM

This application claims the benefit of U.S. Provisional Patent Application No. 62/002,063, filed May 22, 2014, the contents of which are incorporated herein by reference.

TECHNICAL FIELD

The present disclosure relates to methods, techniques, and systems for providing a three-dimensional touch screen.

BACKGROUND

The standard approach to presenting information in a meeting, classroom, or similar context is via a computer coupled to a projector. The presenter loads a slide deck or other teaching material onto the computer, and then uses the projector as an output device to project the video output of the computer onto a screen or wall. In this approach, it is difficult for the presenter to interact with the teaching materials, beyond paging through the slide deck or other simple interaction. For example, if the presenter wishes to manipulate objects shown on the screen, the presenter needs to use a mouse or other pointer input device. Unfortunately, using a mouse during a presentation is often awkward; for example, because it may be difficult for the presenter to simultaneously use the mouse, interact with the audience, and see the screen.

One approach to addressing these issues is to instead use a touch-enabled display. One type of touch-enabled display is an active touch-sensitive flat panel video display, such as a touch-enabled LCD monitor. Another type of touch-enabled display is a projection-based system which includes a touch-sensitive panel upon which video images are displayed by way of a projector. One example of such a projection-based system is the SMART board produced by Smart Technologies.

Unfortunately, such touch-enabled displays suffer from a number of drawbacks. First, touch-sensitive flat panel LCD displays can be quite expensive, particularly when larger display sizes are desired. Also, technologies such as the SMART board require special hardware, in the form of a touch-sensitive white board. Also, such technologies are not capable of detecting the position of the user's finger or hand unless it is in contact with the display surface. In other words, these technologies only function in two dimensions, limiting the types of user interface modalities they can support.

The arrival of gesture control devices including Microsoft Kinect, Intel RealSense, Leap Motion and some other wearable devices such as the Myo arm band has given rise to a new mode of human computer interaction using gestures in the air. While such devices do have a three dimensional aspect to their interaction, the user often has the complex task of coordinating their air gestures with the interface that is set at a distance. Using such devices, the user does not have a direct, tangible interaction with a physical object (e.g., a screen) that provides a "what you touch is what you are interacting with" type experience. This shortcoming often results in frustration and/or extensive training of the user.

BRIEF DESCRIPTION OF THE DRAWINGS

FIG. 1 is an example block diagram of a touch screen manager according to an example embodiment.

FIGS. 3A and 3B illustrate interaction modes according to example embodiments.

FIGS. 5A-5B provide a first view of interaction with a three-dimensional touch screen.

FIGS. 6A-6B provide a second view of interaction with a three-dimensional touch screen.

FIGS. 7A-7H illustrate setup and calibration screens and processes according to example embodiments.

FIGS. 8A-8B are example block diagrams showing process and data flows according to example embodiments.

FIGS. 9A-9J are example flow diagrams of touch screen management processes performed by example embodiments.

DETAILED DESCRIPTION

Figure 2C:
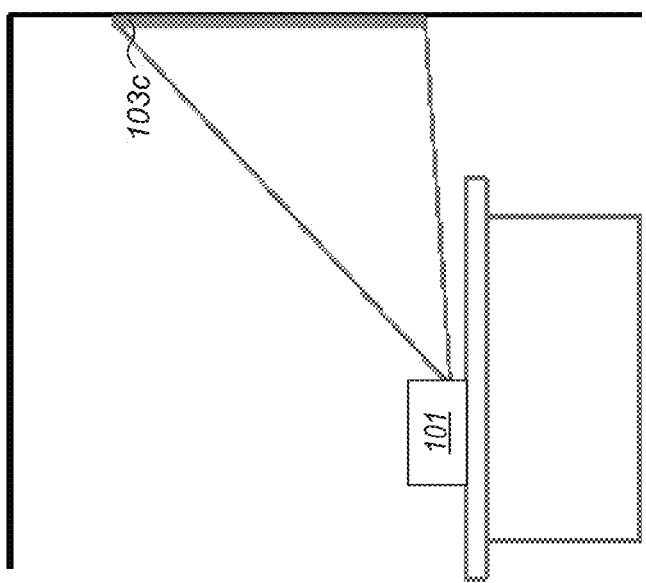
FIGS. 2A-2C illustrate the positioning of a visual sensor according to example embodiments.

Embodiments described herein provide enhanced computer- and network-based methods and systems for providing a three-dimensional touch screen. Some embodiments provide a Touch Screen Manager ("TSM"), as described further below.

1. Touch Screen Management System Overview

FIG. 1 is an example block diagram of touch screen manager according to an example embodiment. In particular, FIG. 1 shows a Touch Screen Manager ("TSM") 100 executing on a computer system 10 that also includes an application program 30. The computer system 10 displays a user interface 103 via a projector 102. In other embodiments, the user interface 103 is displayed via a display panel, such as may be provided by a video wall, LCD screen, or the like.

A visual sensor 101 detects positions of objects in a three-dimensional space (an "interaction zone") in front of the screen 103. In this example, the visual sensor 101 detects the hand 111 of a user 110. The visual sensor 101 provides position information regarding the detected object to the manager 100. The position information may be, for example, a 3D point expressed as an (x, y, z) coordinate in the frame of reference of the screen 103 or some other fixed object or location.

The manager 100 converts the received position information into user interface events, including gestures (e.g., pinch, swipe), mouse-type events (e.g., click, drag), or the like. The user interface events are provided to the application program 30 or some other module of the computer system 10, such as an event dispatcher of the operating system.

By employing the techniques described herein, the manager 100 provides a 3D touch screen, which is an interactive display that has the properties of a touch screen, but the interaction is in 3D space. Users can directly touch and interact with elements on the display. Also, interaction can be anywhere in the 3D space in front of the display and will be matched to relevant objects on the display. The display itself can be 2D or 3D (spatially or visually), physical display panels (e.g., LCD display) or projected displays (as shown in FIG. 1).

In order to enable 3D interaction as well as a sense of where the interaction is happening spatially with respect to the display a depth sensor is used as the visual sensor 101. A depth sensor can detect distance of objects or pixels in 3D space. The sensor can be stand alone or combined with the display (for example a projector that has embedded depth sensor). Different technologies may be employed for the depth sensor, including stereo camera triangulation, light sheet triangulation, structured light scanning, or the like. Some embodiments use a Kinect sensor as the visual sensor 101. Some sensors, such as the Kinect, include a visible light camera and a depth sensor. The visible light camera functions as a color sensor. The depth sensor comprises an infrared laser projector and a monochrome CMOS sensor, which captures 3D data in ambient light conditions.

When the user starts the manager 100, it provides directions on the best placement of the sensor 101, whether the current display is supported, whether the display is within the working range of the sensor, whether the lighting conditions are ideal, which mode(s) of interaction can be performed for current configuration, and the like.

Once an ideal placement of sensor and display has been found, the user 110 can trigger auto calibration. The calibration process involves detection of the position and orientation of the display in the view of the sensor 101, for example by displaying a specific pattern on the display 103. This is typically done independent of the position and orientation of the display 103 with respect to the sensor 101. This typically makes use of color or visible spectrum sensing capabilities of the sensor 101. The calibration process may also involve detection of shape, size and geometry of the surface where the display 103 is created. This uses the depth sensing capabilities of the sensor.

Note that calibration can be performed behind the scenes and/or concurrently with the setup of the system. For example, calibration may be performed as the user is adjusting the position of the sensor and the display, by actively looking for the display screen in its view.

Also, the calibration process may intelligently detect that detects that the same physical set up is being used as was used previously (e.g., based on the position of the display with respect to the sensor). If such a condition is detected, the manager 100 may either auto-calibrate (e.g., without user intervention, input, or engagement) or skip calibration altogether.

Once the calibration is completed, the user 110 can interact with his body (e.g., hand, finger, feet) or some other device such as a pen, stick, laser pointer, or the like. A pen may include an active infrared ("IR") light source that is tracked by infrared sensing capabilities of the sensor. Based on the current conditions (e.g., the resolution of depth sensing for the current distance of the display from sensor or the lighting condition), the manager 100 automatically picks the best mode of interaction. If the sensor 101 can resolve fingers, the manager 100 will track individual fingers. If the resolution is low the manager 100 may track the hand of the user 110. Depending on the light condition and distance, the manager 100 may enable pen tracking, or the like.

Based on the information of the geometry of the display 103 and the mode of interaction employed by the user 110, the manager 100 detects the relevant interaction input object (e.g., finger, hand, pointer) and determines its position in 3D (x, y, z) with respect to the display 103. This (x, y, z) position can then be used to generate events such as simulation of touch (e.g., press down, swipe, click etc.), simulation of mouse (e.g., click, hover, select, right click, double click), simulation of digitizer (e.g., hover, write, erase), or 3D gestures (e.g., approach the display to zoom in). A combination of the (x, y, z) position of multiple input objects may trigger other types of gestures (e.g., pinch and zoom with two hands or fingers).

To ease the interaction and compensate the low depth resolution, there may be interaction zones introduced to convert (x, y, z) coordinates into (x, y, n) coordinates, where the n value represents different states such as touch down, hover, or the like. The interaction zone may be anywhere between a few inches or a few feet, depending on various factors, such as the arrangement and location of the sensor 101 with respect to the display 103.

The manager 100 offers visual feedback based on the (x, y, z) coordinates, such as changing the size, transparency, or color of a touch down circle. A touch down circle is an example visual cue that indicates the location and/or type of user interface event recognized by the manager 100. Different interaction zones, interaction modes (e.g., finger, hand, pen), or simulation events (e.g., touch, mouse, digitizer) may be distinguished by different visual cues in real time.

The manager 100 may also provide a "guided mode" of interaction. In this mode, the manager 100 provides visual and audible feedback to the user on his interaction. For example, if the user 110 moves so fast that the system cannot correctly detect his gesture, the manager 100 may ask the user 110 to slow down. Or if the user's hand or pen is occluded from the line of sight of the sensor, the system may notify the user 110. The feedback thus trains the user 110 to perform the gestures in a more ideal or detectable fashion. In addition, the manager 100 may also adapt to the behavior of the user 110. For example, if the user 110 repeatedly triggers an unintended gesture, the system may suppress the detection of such events.

The manager 100 may also provide a preview user interface (UI). The preview UI prepares the user to have the best possible way to set up all the hardware and select the software configuration. After calibration, the preview UI may minimize to a floating menu that can stay on top of any application. The user can use the floating menu to switch pen/hand modes, touch/mouse/pen events in real time. The user can even temporarily turn off the interactivity of the display with the floating menu, although the floating menu remains interactive so that user can turn the interactivity back on.

The preview UI includes both live visual images and text and performs one or more of the following functions: previewing the video of the color sensor (e.g., visible light camera on a Kinect) so that user can set it in a place where the whole display is visible to the sensor; previewing how far the display is and what mode of interaction is suitable for the current configuration; previewing if the current display surface is supported; previewing if the current lighting condition is supported; providing hints on how an ideal working setup can be achieved, such as by instructing the user to move the sensor closer, move sensor to the left, or the like; providing an option to choose which visible part of the display or which display will be made interactive; and the like. Note that the ability to select the visible part of a display (or which display) to make interactive means that there is no limit to the screen size that can be supported, facilitating interaction with large auditorium-scale screens, for example.

The manager 100 may also perform partial calibration to turn part of the screen interactive. To do so, the manager 100 will provide a resizable user interface (window) to let the user drag and resize to define which part of the screen need to be calibrated and turn interactive. Once the region is selected, the manager 100 will display a pattern in the region and calibrate only for that region. This can be very helpful if the user wants to turn part of a huge display wall interactive or wants to limit the interaction to part of the display (so that the user is restricted from accessing certain areas on the screen (e.g., the Windows 8 charm bar) and/or use the rest of the screen (inactive region) for other purposes.

The manager 100 may also perform auto-calibration upon initial setup or change of sensor position. During calibration, the user can decide what areas of the display need to be calibrated. Note that the display space need not be planar. The calibration builds a 3D model of the space.

A two-step calibration process may be employed. In case a surface is not visible to the depth sensor, the user can first calibrate the display to visible spectrum and then use a different object (which is visible to the depth sensor) to cover the display up and perform background calibration. In some permanent kiosk-like deployments, the user can choose to let the auto calibration start automatically or skipped when application is started. If auto-calibration is skipped, previous saved parameters will be used. When the sensor or the display is moved the system automatically recalibrates.

The manager 100 may also select an interaction mode based on environmental factors. The manager 100 is able to automatically use what mode of interaction is best suited based on several factors such as the depth resolution of the sensor at the current distance, lighting condition, and the like. If the manager 100 can resolve fingers, it will track individual fingers. If the resolution is low, the manager 100 may track hands. Depending on the light condition and distance, the manager 100 may enable pen tracking, or the like.

Some embodiments provide a pen-based device. The pen includes an IR LED that is attached to a pressure sensitive tip. The tip when pressed emits an IR light that is tracked by the sensor. The LED can also be lit up by a simple button. Since the manager 100 knows the geometry of the space during the auto calibration process it knows exactly in which (x, y, z) coordinate the pen is triggered. The motion and position of the pen can then be translated into a gesture the same way as in hand and finger.

The user is able to switch between pen and hand/finger mode. This can be enabled multiple ways. Whenever the IR LED is on, pen mode is triggered. However this may pose challenges, when the user briefly switches off the pen (for example in between writing, such as dotting an 'I'), the writing canvas could be moved by the touch event, but the user actually still wants to be in pen mode to complete the "dot". Various options are available for switching modes:

When the pen mode is enabled by user by holding it close to the display surface, a message can be sent to the software by the pen to enable the pen mode. The pen may detect its proximity to the surface using a range sensor.

The pen can have a switch that user can manually turn on to indicate that the current mode is pen mode. The status of the switch can be communicated via a visual signal or a wireless signal to the manager 100.

The manager 100 may provide a menu for use to switch modes. The menu can be in the main application or as a context menu/floating menu which can be triggered by a gesture such as edge gesture or press and hold.

Other variations, extensions, and enhancements are contemplated. For example, in one embodiment, the described techniques are employed to make a display-less physical space interactive. A display-less physical space is one where there is no user interface that is displayed by a projector or other light emitting display medium (e.g., LCD screen). For example, one may want to track the interaction of a customer/user in a retail store and detect what products on a display case he is interacting with. In order to do this, the system can be calibrated to the "invisible display" (the display case), by (1) manually specifying where the display case is within the view of the sensor, (2) temporarily using a projector or display panel to assist in calibration, or (3) using a printed pattern to visually notify the sensor where the display case is.

Once the calibration is done, the system tracks the user's interaction in the space just like it tracks user's interaction with content as presented via a projector, video wall, or other medium. For example the system will know in what part of the display case the user picked up an object. There can be digital content or functionality that is triggered in the background based on the user's behavior. For example, analytics software may be invoked to track the user's behavior. As another example, is could also or instead be providing real time information to the user based on his interaction. For example, when a user picks up a DVD, its trailer can be played on a nearby monitor; when a user picks up a CD, a clip from that CD can be played on a nearby speaker; when a user interacts with an item, a message can be sent to a store clerk to provide assistance; and the like. By deploying the described techniques in a display-less context, physical objects are effectively transformed into digital controls (e.g., buttons) that invoke associated functions.

Another embodiment provides a "remote mode." In this mode, the computer (e.g., system 10) where the software (e.g., the TSM 100) is running will just act as a conduit. It will grab the display (through wire or wirelessly) from another client system and show it on the projected/physical display. It will also relay back the interaction events to the client system. An example deployment includes a machine set up in a conference room running the TSM 100 and connected to a projector 102 and sensor 101. The user 110 may wirelessly pair his tablet or other computing device with this machine. Then the projector 102 will display the content of the tablet, the user interacts with the content of the tablet directly on the projected display; and the TSM 100 forwards events to an application running on the tablet.

2. Aspects of Example Embodiments

Additional details related to example embodiments are provided below with reference to FIGS. 2-8.

Figure 2B:
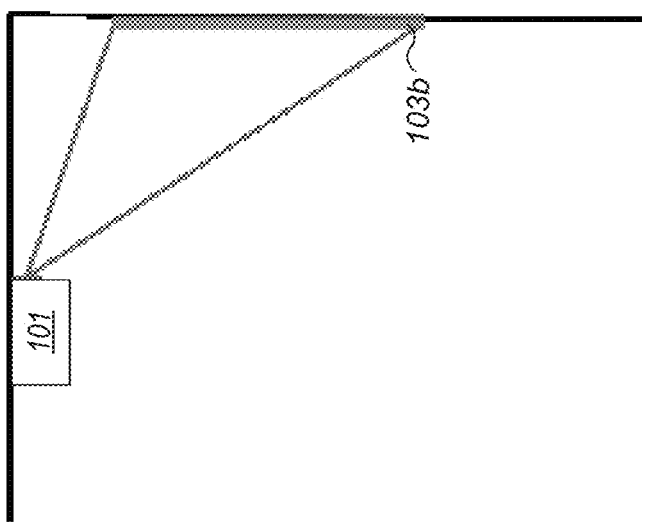
Figure 2A:
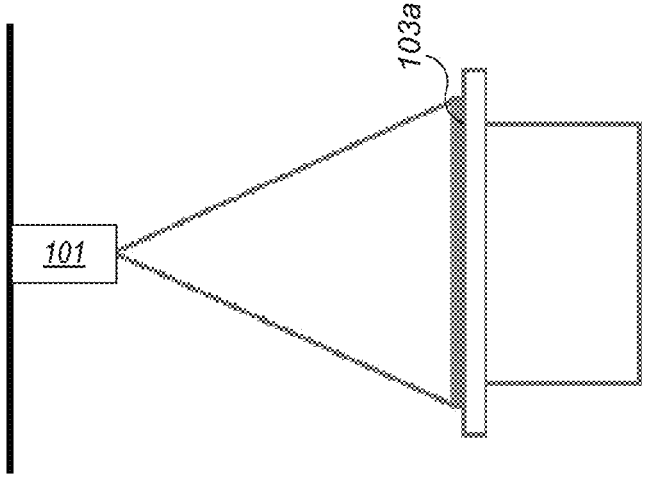

FIGS. 2A-2C illustrate the positioning of a visual sensor according to example embodiments. As a general matter, the visual sensor 101 can be placed anywhere in front of the display, as long as the whole interaction surface is visible to the sensor and the user's interaction on the display is not occluded from the sensor. Because the resolution of typical visual sensors decreases with distance, it is preferred that the visual sensor 101 be placed as close to the display as possible, while still being able to capture the entire display (or its relevant interaction surface) in its field of view.

In FIG. 2A, a display 103a is arranged horizontally on a table top or similar surface, while the sensor 101 is located substantially directly above on the ceiling. In FIG. 2B, a display 103b is arranged vertically on a wall or similar surface, while the sensor 101 is located on a ceiling. In FIG. 2C, a display is arranged vertically on a wall or similar surface, while the sensor 101 is located on a table top or similar surface.

Figure 3B:
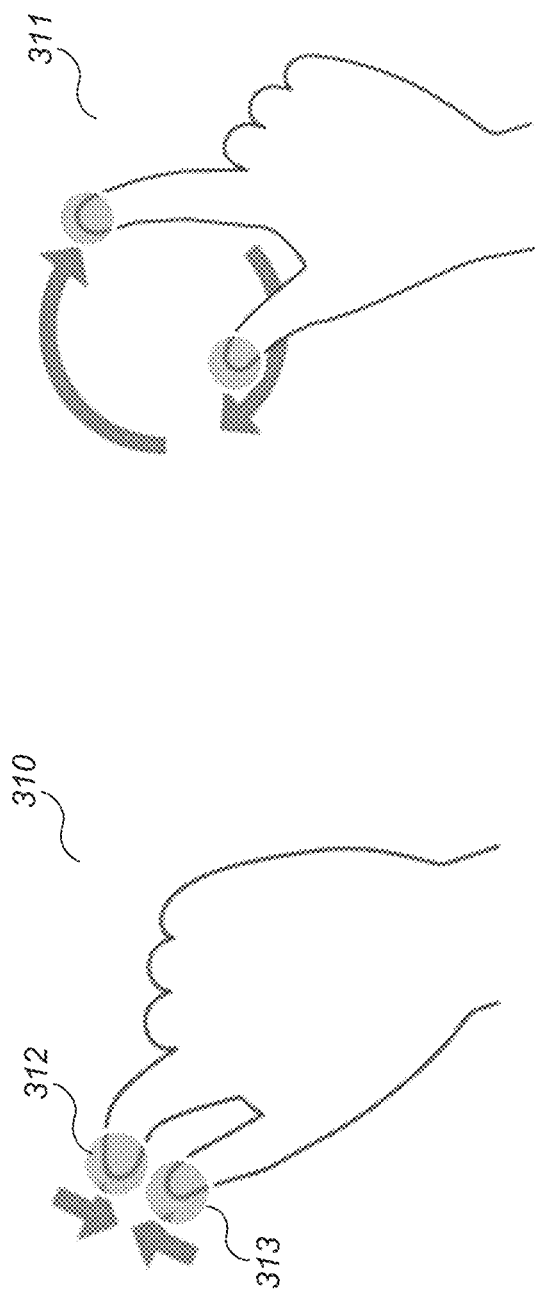

FIGS. 3A and 3B illustrate interaction modes according to example embodiments. In particular, FIG. 3A illustrates a finger mode 301, a hand mode 302, and a pen mode 303.

Some embodiments will support all three modes, while others will support a greater or lesser number of modes. Also, in some embodiments, the manager 100 will automatically select which modes to utilize (or make available) depending on the environmental conditions or other factors (e.g., whether the user is holding the pen or other pointer device).

Also visible in the finger mode 301 is a touch down circle 304. The touch down circle 304 is an example of a visual cue provided by the manager 100 to indicate that the user's gesture has been recognized and forwarded to the relevant application. Other modes support similar visual cues. Other embodiments may use different cues and/or other cues for other events or gestures.

FIG. 3B illustrates the use of multi-touch interaction in a finger-based interaction mode, such as finger mode 301. This example illustrates a pinch gesture 310 and a rotate gesture 311. In these interactions, the manager 100 tracks multiple touch points, as illustrated by touch circles 312 and 313.

Figure 4C:
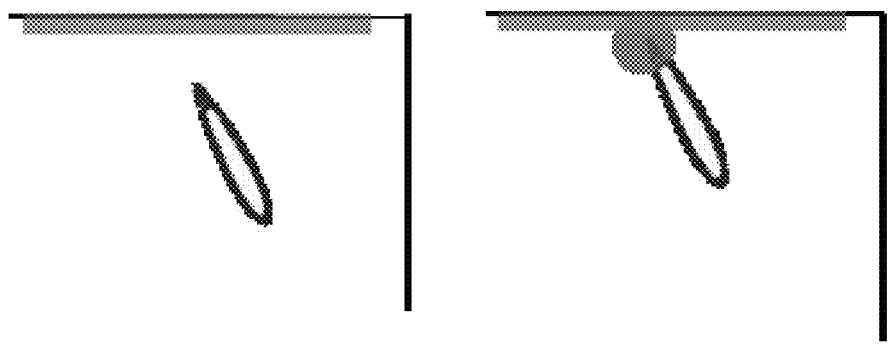
FIGS. 4A-4C illustrate an example touch gesture according to different interaction modes in an example embodiment.
Figure 4B:
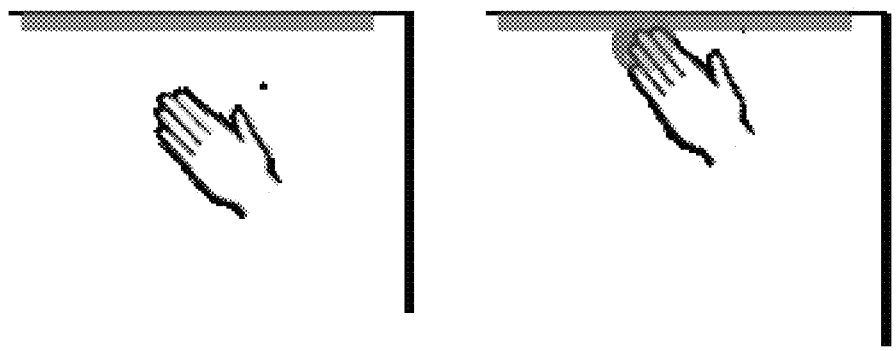
Figure 4A:
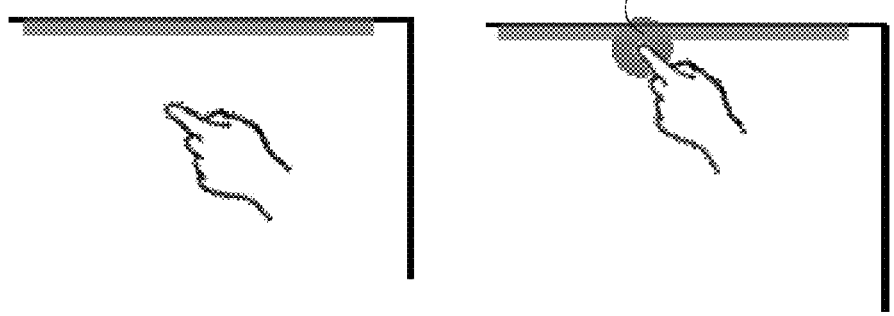

FIGS. 4A-4C illustrate an example touch gesture according to different interaction modes in an example embodiment. In particular, each of FIGS. 4A-4C depicts touch up and touch down interaction in finger, hand, and pen modes, respectively. For example, in FIG. 4A, the touch up state is shown at top, while the touch down state is shown at bottom. The touch down state is indicated by way of a touch down circle 401. Touch down circles are similarly used in the hand and pen modes depicted with respect to FIGS. 4B and 4C.

Note that while FIGS. 4A-4C depict a binary touch up/down event, the three dimensional capabilities of the described system may also be reflected in the visual cues provided. For example, in FIG. 4A, the touch down circle 4A may increase in size as the user's finger nears the surface. When the finger touches the surface, or gets closer than some threshold distance, the touch down circle may 401 may change color or give some other indication that a touch event has been generated.

FIGS. 5A-5B provide a first view of interaction with a three-dimensional touch screen. In particular, FIGS. 5A and 5B provide a first perspective view of an interaction zone 501 adjacent to a display 103. The interaction zone 501 is a 3D rectangular prism represented in dashed lines, while the display 103 is represented in solid lines. As user 110 moves forward his hand enters the interaction zone 501, as shown in FIG. 5B. Within the interaction zone 501, the manager 100 tracks objects (e.g., the user's hand or finger) and generates corresponding user interface events.

FIGS. 6A-6B provide a second view of interaction with a three-dimensional touch screen. In particular, FIGS. 6A and 6B provide a second perspective view of the interaction zone 501 discussed with respect to FIGS. 5A and 5B, above. This view again shows the user moving towards the display 103 from a first position (FIG. 6A) to a second position (FIG. 6B). In FIG. 6B, the user's hand has entered the interaction zone 501.

FIGS. 7A-7H illustrate setup and calibration screens and processes according to example embodiments. The screens depicted by FIGS. 7A-7H are presented by the manager on a display of the user's computer (e.g., laptop) and/or the screen 103 in order to guide and instruct the user to properly set up and calibrate the described three-dimensional touch screen.

Figure 7A:
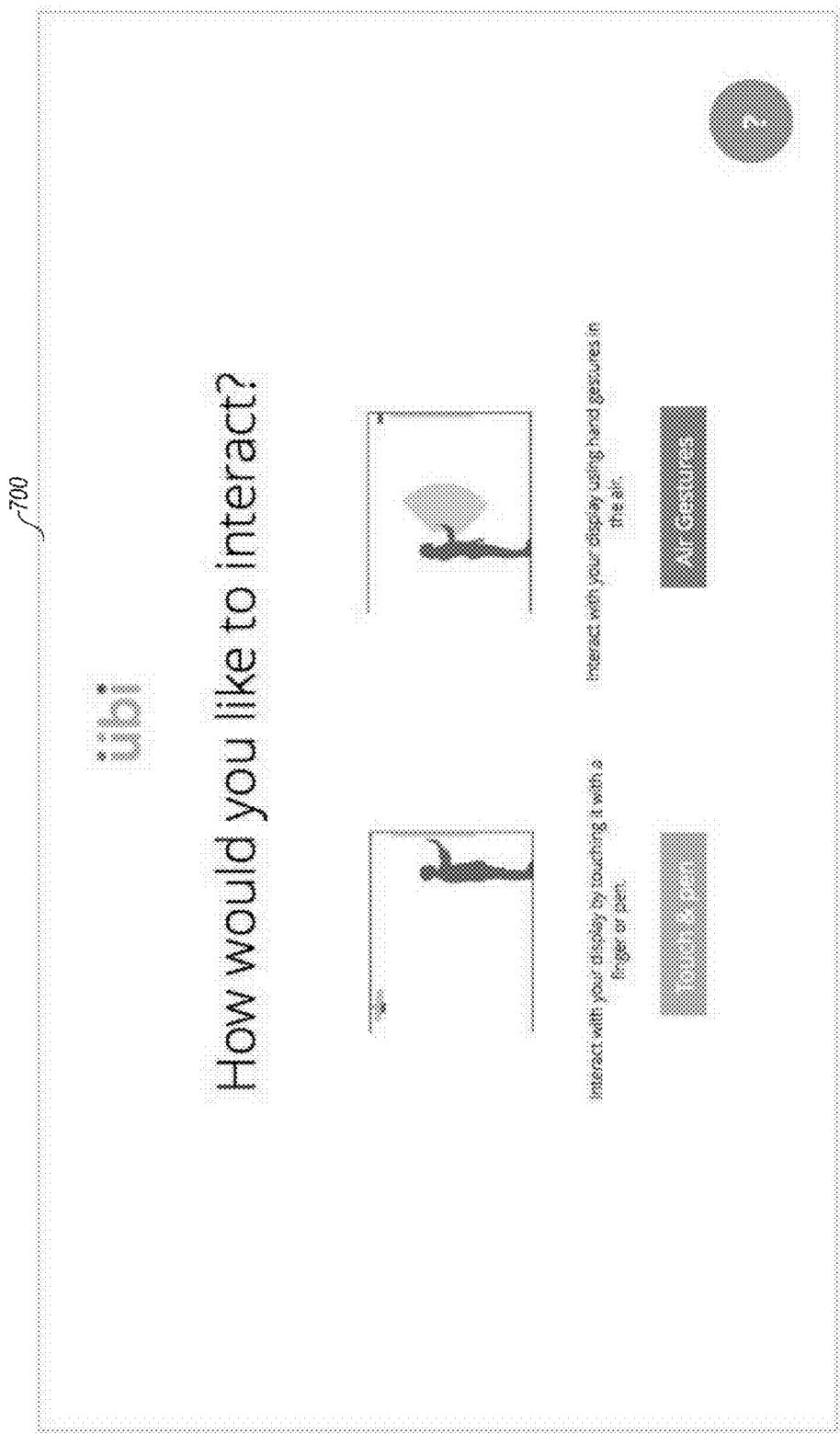

FIG. 7A depicts a setup screen 700. Screen 700 prompts the user to select between two interaction modes: (1) touch and pen or (2) air gestures. In the touch and pen mode, the user interacts by touching the display. In the touch and pen mode, can automatically switch between use of touch or the pen. For example, fi the system detects the presence of the pen, it automatically uses the pen mode, and otherwise uses the touch mode. Alternatively, or in addition, the user can switch between touch and pen by way of a gesture or other input. In air gestures mode, the user can interact with hand gestures in the air in the 3D space between the display and the sensor.

FIG. 7B depicts a screen 710. Screen 710 prompts the user to select between a projector and an LCD/LED monitor to use as a display.

Figure 7C:

FIG. 7C depicts a screen 720. Screen 720 directs the user to create a display on a wall. Once the user has created the display, the selects the Measure Display button to cause the described system to measure the display and determine whether it is of appropriate size.

Figure 7D:
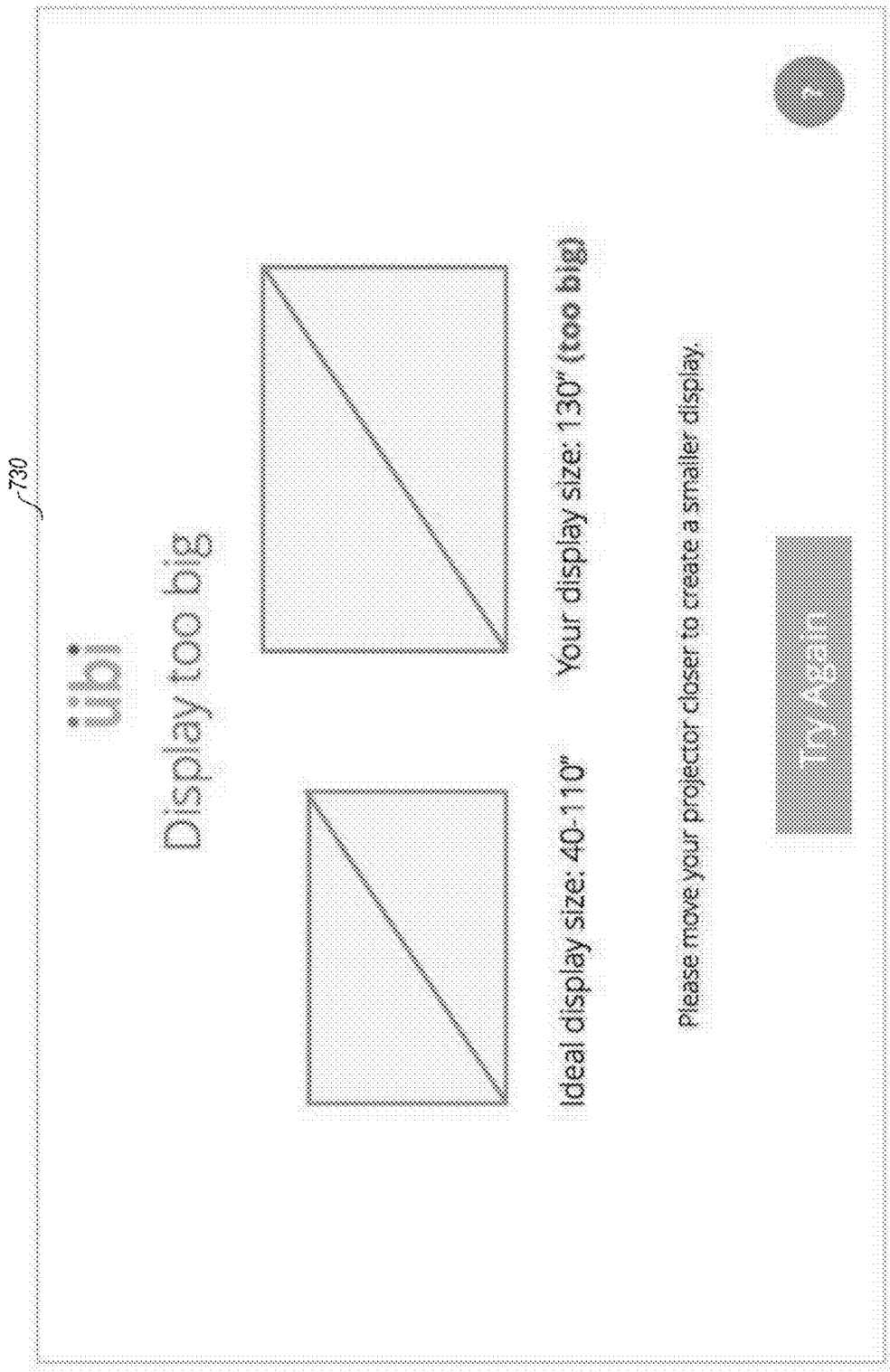

FIG. 7D depicts a screen 730. Screen 730 provides information regarding the measured display size. In this example, the user is notified that the display size is too large, because the projector is too far away from the wall. The user is instructed to move the projector closer and try again.

At this stage in the setup process, other messages may be presented to the user depending on the conditions detected by the manager 100. For example, the display may be too small, because the projector is too close. As another example, the manager 100 may not be able to detect the surface, such as due to lighting conditions, glare, or the like. When such conditions are detected, the user will be instructed or guided to address or correct them.

Figure 7E:
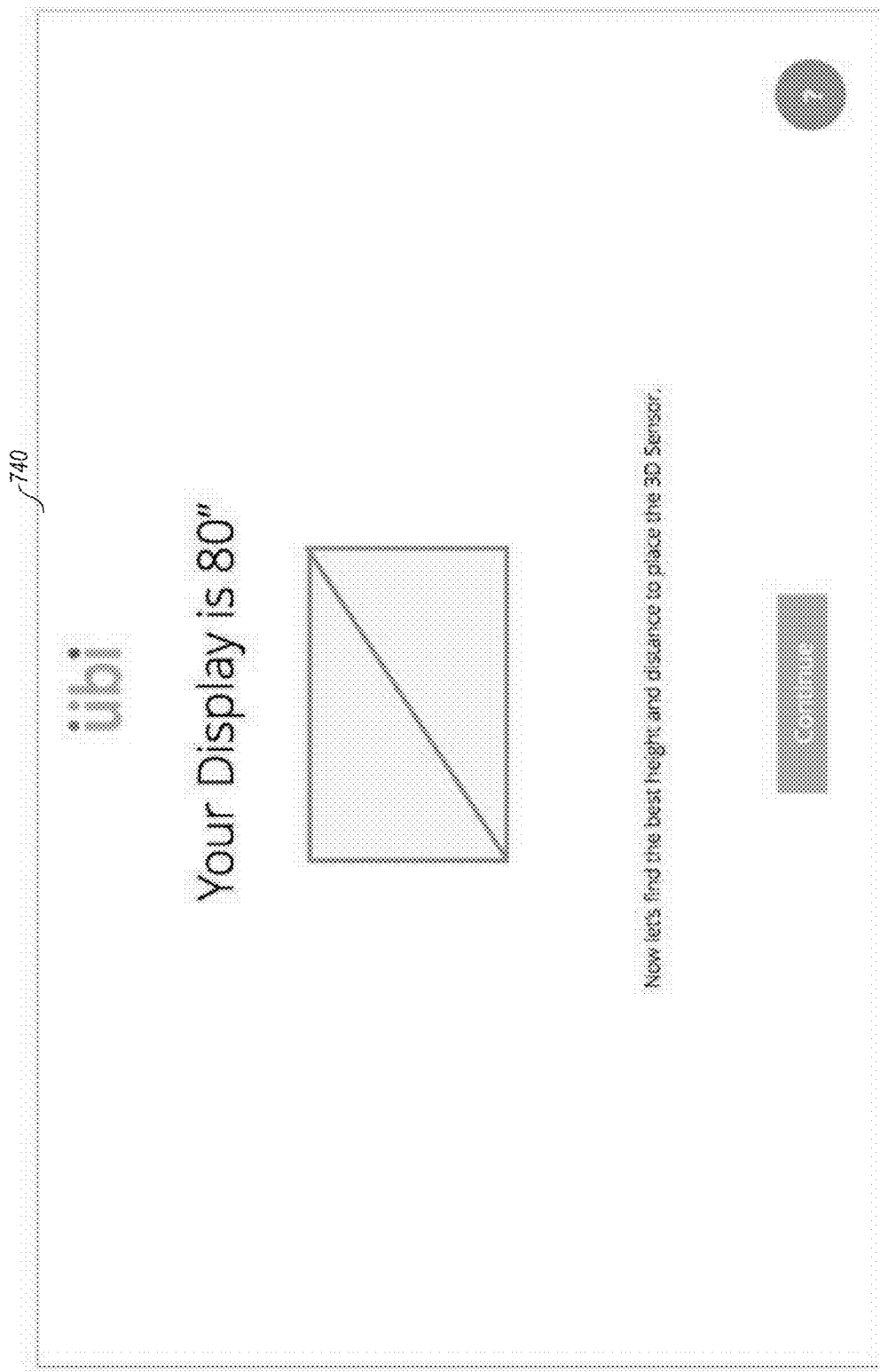

FIG. 7E depicts a screen 740. Screen 740 is displayed once the display has been measured as having a suitable size.

Figure 7F:

FIG. 7F depicts a screen 750. Screen 750 provides instructions regarding the positioning of the sensor. In this example, a message notifies the user of the ideal distance (40-65") as well as the detected distance (68"). If the user changes the position of the sensor, this screen will be updated to reflect the detected distance. In this way, the user can interactively adjust the position of the sensor with respect to the display.

Figure 7G:
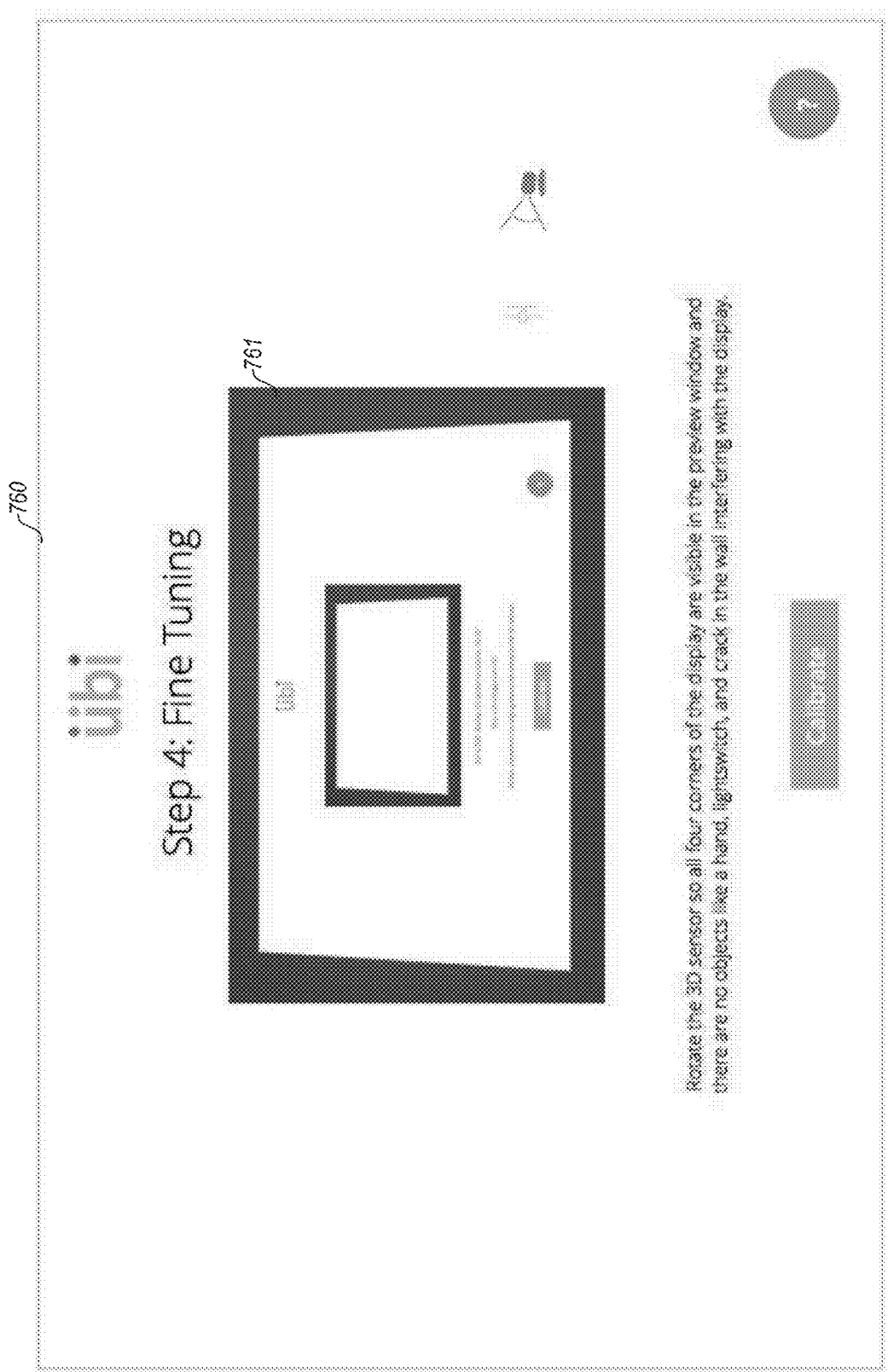

FIG. 7G depicts a screen 760. Screen 760 instructs the user to fine tune the position (e.g., rotation, elevation) of the sensor to that all four corners of the display are visible in a provided preview window 761. The preview window shows the display as it is captured by the color camera of the sensor. Once the sensor is properly adjusted, the user can initiate calibration by selecting the Calibrate button.

Figure 7H:
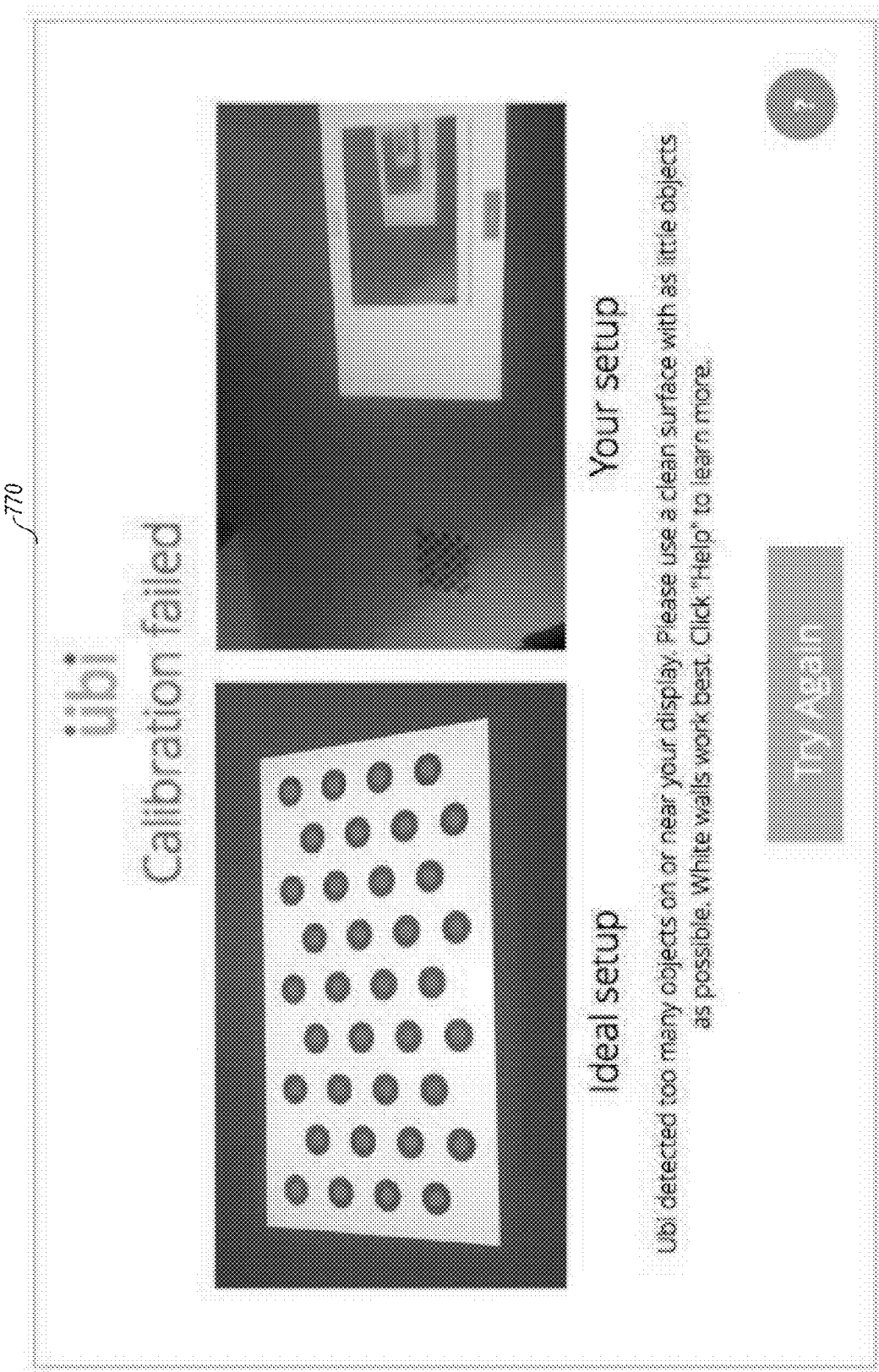

FIG. 7H depicts a screen 770. Screen 770 is a calibration results screen that notifies the user of calibration issues and how to correct them. In this example, screen 770 notifies the user that calibration failed because too many objects have been detected on or near the display. The user is instructed to use a clean surface with as few objects as possible.

Other conditions may be detected at this stage in the process. For example, the manager 100 may not be able to detect the display area because the projector is not bright enough. As another example, the manager 100 may not be able to see the entire display due to an obstruction. In each of these cases, the screen 770 may provide instructions for addressing or fixing the problem.

Once the manager 100 properly calibrates the screen, the user will be notified that setup and calibration is complete. Note that although the screens of FIGS. 7A-7H are shown in sequence, they may be displayed in different orders in other embodiments or conditions. For example, the manager 100 may determine, early in the process, that the current setup (e.g., display size, sensor distance) is similar to or the same as a previously used setup and in response, attempt to perform auto-calibration without any further user interaction.

FIGS. 8A-8B are example block diagrams showing process and data flows according to example embodiments. FIG. 8A depicts an arrangement similar to that shown in FIG. 1, above. In this arrangement, the manager 100 (not shown) resides and executes on a computer system 10 (e.g., laptop, tablet, smart phone), which communicates both with a sensor 101 and a projector 102. The projector 102 projects video data received from the computer system 10 onto the display screen 103.

FIG. 8B depicts an arrangement that supports the "remote mode," discussed above. In this arrangement, a computing device 800 executes the manager 100 (not shown) and acts as a conduit between the computer system 10 (e.g., laptop, tablet, smart phone) on one side and the sensor 100 and projector 102 on the other side. The device 800 receives video data representing the display of the computer system 10, and then forwards that video data to the projector 102. Similarly, the device 800 receives location information and related data about the user 110 from the sensor 101, and generates gestures and other user interface events that are forwarded to the computer system 10.

The arrangement shown in FIG. 8B is advantageous because it supports near-zero configuration on the part of the computer system 10. The user 110 need only pair his computer system 10 with the device 800, which is then responsible for interfacing with the projector 102 and sensor 101, in addition to performing gesture tracking, event generation, and the like.

3. Example Processes

FIGS. 9A-9J are example flow diagrams of touch screen management processes performed by example embodiments.

Figure 9A:
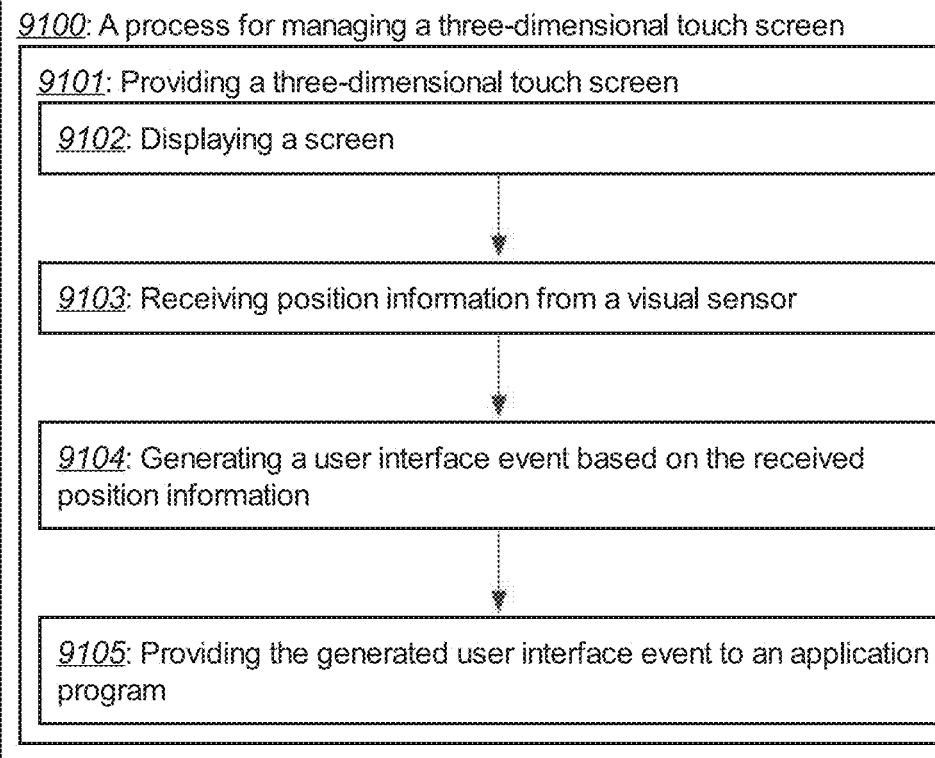

FIG. 9A is a flow diagram of example logic for managing a three-dimensional touch screen. The illustrated logic in this and the following flow diagrams may be performed by, for example, the Touch Screen Manager 100 described with respect to FIG. 1, above. More particularly, FIG. 9A illustrates a process 9100 that includes the following block(s).

Block 9101 includes providing a three-dimensional touch screen that facilitates user interaction in three dimensions by: performing block(s) 9102, 9103, 9104 and 9105, described below.

Block 9102 includes displaying a screen via a display device. The screen is typically an image representing a user interface screen. The image is displayed via a monitor (e.g., LCD, CRT), projector, or the like. The image is displayed on some surface, such as a wall or a floor when the display device is a projector. Note that the surface need not be flat, because the described techniques can generate a 3D model of the surface, as described elsewhere.

Block 9103 includes receiving position information from a visual sensor, the position information reflecting the position of an object in a three-dimensional space located adjacent to the displayed screen. The visual sensor may be a motion sensing input device, such as a Microsoft Kinect device. The sensor may include a one or more sensing devices, including a camera, range/depth sensor, microphone, or the like. The visual sensor determines position in a 3D space adjacent to the displayed screen, typically a rectangular prism situated between the displayed screen and the sensor. The object is typically some part of a user's body, such as a finger, hand, or leg, detected within the 3D space. The object may instead or also be some other item, such as a pen or pointing device.

Block 9104 includes generating a user interface event based on the received position information. The received position information is processed in order to determine a corresponding user interface event, such as a touch screen event or gesture, mouse-type event, or the like.

Block 9105 includes providing the generated user interface event to an application program. The generated user interface event is then provided, directly or indirectly, to some application program or other module of the computing system that is executing the process.

Figure 9B:
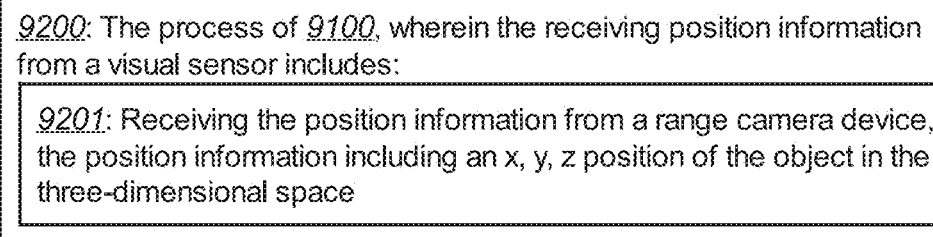

FIG. 9B is a flow diagram of example logic illustrating an extension of process 9100 of FIG. 9A. More particularly, FIG. 9B illustrates a process 9200 that includes the process 9100, wherein the receiving position information from a visual sensor includes the following block(s).

Block 9201 includes receiving the position information from a range camera device, the position information including an x, y, z position of the object in the three-dimensional space. As noted, the 3D space may be rectangular prism in front of the surface on which the screen is displayed. Other 3D spaces may also or instead be used, such as a cylinder or sphere. The x, y, z position may be expressed in a coordinate system relative to the surface, the visual sensor, or some other frame of reference.

Figures 9C, 9D:

FIG. 9C is a flow diagram of example logic illustrating an extension of process 9100 of FIG. 9A. More particularly, FIG. 9C illustrates a process 9300 that includes the process 9100, and which further includes the following block(s).

Block 9301 includes presenting a setup user interface that instructs a user regarding one or more of: placement of the visual sensor, whether the display device is supported, whether the displayed screen is within range of the visual sensor, and whether lighting conditions are acceptable. Typically, the setup user interface is provided upon initial installation or configuration. The setup user interface may guide the user through the placement of the visual sensor, adjustment of the lighting conditions, or the like. In some embodiments, the setup user interface displays a visual representation of the field of coverage of the visual sensor, so that the user can adjust the position of the sensor to cover the entire display surface. The setup user interface may also inform the user whether the current conditions support a particular interaction mode, such as finger-based interaction, hand-based interaction, pen-based interaction, or the like, depending on the resolution and other factors afforded by the current conditions. Example screens presented during setup are shown and described with respect to FIGS. 7A-7H.

FIG. 9D is a flow diagram of example logic illustrating an extension of process 9100 of FIG. 9A. More particularly, FIG. 9D illustrates a process 9400 that includes the process 9100, and which further includes the following block(s).

Block 9401 includes calibrating the three-dimensional touch screen by: performing block(s) 9402 and 9403, described below. Calibration may include generating a 3D model of the display surface, such as based on the positions of numerous points detected by the visual sensor. Calibration may also be performed concurrently with the user adjusting the position of the visual sensor with respect to the display. Calibration may also include performing a partial calibration, in which the user selects a portion of the display screen to make interactive. Calibration may also include interactively guiding the user through the setup process, such as is described with respect to FIGS. 7A-7H.

Block 9402 includes detecting position and orientation of the displayed screen based on a displayed pattern.

Block 9403 includes detecting shape, size, and geometry of a surface on which the screen is displayed.

FIG. 9E is a flow diagram of example logic illustrating an extension of process 9400 of FIG. 9D. More particularly, FIG. 9E illustrates a process 9500 that includes the process 9400, wherein the calibrating the three-dimensional touch screen includes the following block(s).

Block 9501 includes determining, based on the position of the visual sensor with respect to its display, that a current physical setup is substantially similar to a previously used physical setup. For example, the process may determine that the distance or position of the sensor with respect to the display is the same or nearly the same as that used the last time the system was operated.

Block 9502 includes in response to the detecting, performing auto-calibration without user input and/or skipping calibration and relying on calibration information determined with respect to the previously used physical setup. When a substantially similar setup condition is detected, the process may default to previously used calibration information, and/or prompt the user to determine whether he wants to skip calibration and use previous settings.

FIG. 9F is a flow diagram of example logic illustrating an extension of process 9100 of FIG. 9A. More particularly, FIG. 9F illustrates a process 9600 that includes the process 9100, and which further includes the following block(s).

Block 9601 includes automatically selecting an interaction mode based on operating conditions of the three-dimensional touch screen, the operational conditions including one or more of current resolution, current lighting conditions, distance between the displayed screen and the visual sensor, and an object being held by a user of the touch screen. Different interaction modes may be supported, including finger-based interaction, hand-based interaction, pen-based interaction. Some embodiments will automatically select between these modes based on factors such as the current resolution (e.g., based on the position of the visual sensor), the lighting conditions, or the like. Some embodiments will detect whether the user is holding an object, such as a pen or other type of pointer, and if so, automatically select a pen-based interaction mode.

FIG. 9G is a flow diagram of example logic illustrating an extension of process 9100 of FIG. 9A. More particularly, FIG. 9G illustrates a process 9700 that includes the process 9100, wherein the receiving position information from a visual sensor includes the following block(s).

Block 9701 includes receiving position information that reflects the position of a pen device that includes a light source attached to a pressure sensitive tip, the tip when pressed configured to cause the light source to emit an infrared light signal that is tracked by the visual sensor. In some embodiments, the process supports pen-based interaction, via a device that is configured to emit a visual signal (e.g., in the infrared spectrum) when it is pressed or otherwise touches the display surface. The process may switch between pen-based interaction and finger-based interaction based on a user gesture, a signal received from the pen, a selection of a menu item or other user interface control, or the like.

FIG. 9H is a flow diagram of example logic illustrating an extension of process 9100 of FIG. 9A. More particularly, FIG. 9H illustrates a process 9800 that includes the process 9100, and which further includes the following block(s).

Block 9801 includes performing displaying a screen by receiving screen data from a first device executes the application program and that is wirelessly coupled to a second device that is performing the method. As noted, some embodiments support a "remote mode" of operation, in which the presented screen is obtained from a remote device, such as a tablet or other computer that is wirelessly coupled to device that executes the manager 100.

Block 9802 includes performing providing the generated user interface event to an application program by transmitting the generated user interface event to the first device. Once the user interface event is generated, it is transmitted to the application program executing on the remote device.

FIG. 9I is a flow diagram of example logic illustrating an extension of process 9100 of FIG. 9A. More particularly, FIG. 9I illustrates a process 9900 that includes the process 9100, and which further includes the following block(s).

Block 9901 includes determining that a user interface event cannot be generated due to current conditions or action of the user. For example, the process may not be able to detect the location of a pen, because it is hidden from sight by the user's body. As another example, the process may not be able to detect a gesture because the user is moving too fast.

Block 9902 includes in response, providing visual or audible feedback to a user to modify the condition or their action. The process may request the user to slow down, stop blocking the line of sight to the pen or his hand, or the like.

Figure 9J:
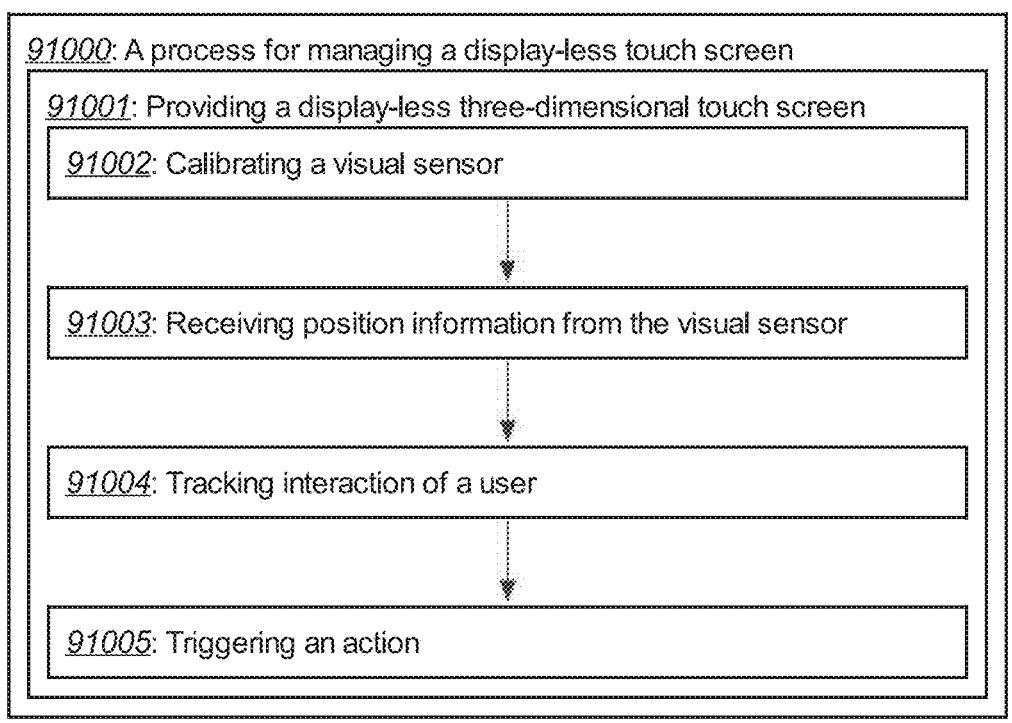

FIG. 9J is a flow diagram of example logic for managing a display-less touch screen. The illustrated logic in this and the following flow diagrams may be performed by, for example, the Touch Screen Manager 100 described with respect to FIG. 1, above. More particularly, FIG. 9J illustrates a process 91000 that includes the following block(s).

Block 91001 includes providing a display-less three-dimensional touch screen that facilitates user interaction in three dimensions by: performing block(s) 91002, 91003, 91004 and 91005, described below.

Block 91002 includes calibrating a visual sensor to a first object that does not visually present output of a computing device. As noted some embodiments can be provide a display-less interaction experience, such as via a display case, a posted map, a museum exhibit, or the like. Calibration may be performed by manual specification of the location of the first object, temporary use of a projector, or via a printed pattern on or about the first object.

Block 91003 includes receiving position information from the visual sensor, the position information reflecting the position of a second object in a three-dimensional space located adjacent to the first object. The visual sensor may be a motion sensing input device, such as a Microsoft Kinect device. The sensor may include a one or more sensing devices, including a camera, range/depth sensor, microphone, or the like. The visual sensor determines position in a 3D space adjacent to the object, typically a rectangular prism situated between the object and the sensor. The second object is typically some part of a user's body, such as a finger, hand, or leg, detected within the 3D space. The second object may instead or also be some other item, such as a pen or pointing device.

Block 91004 includes tracking interaction of a user with the first object, based on the received position information reflecting the position of the second object. The received position information is processed in order to determine a corresponding user interface event, such as a touch screen event or gesture, mouse-type event, or the like.

Block 91005 includes triggering an action based on the tracked interaction. The triggered action may be to present media (e.g., video or audio) on an adjacent device based on the interaction (e.g., a user picks up or touches some element in the display case). Other actions may be triggered, such as recording an identifier of the interaction (e.g., that a particular object was selected by the user), transmitting a message to another user, or the like.

4. Example Computing System Implementation

Figure 10:
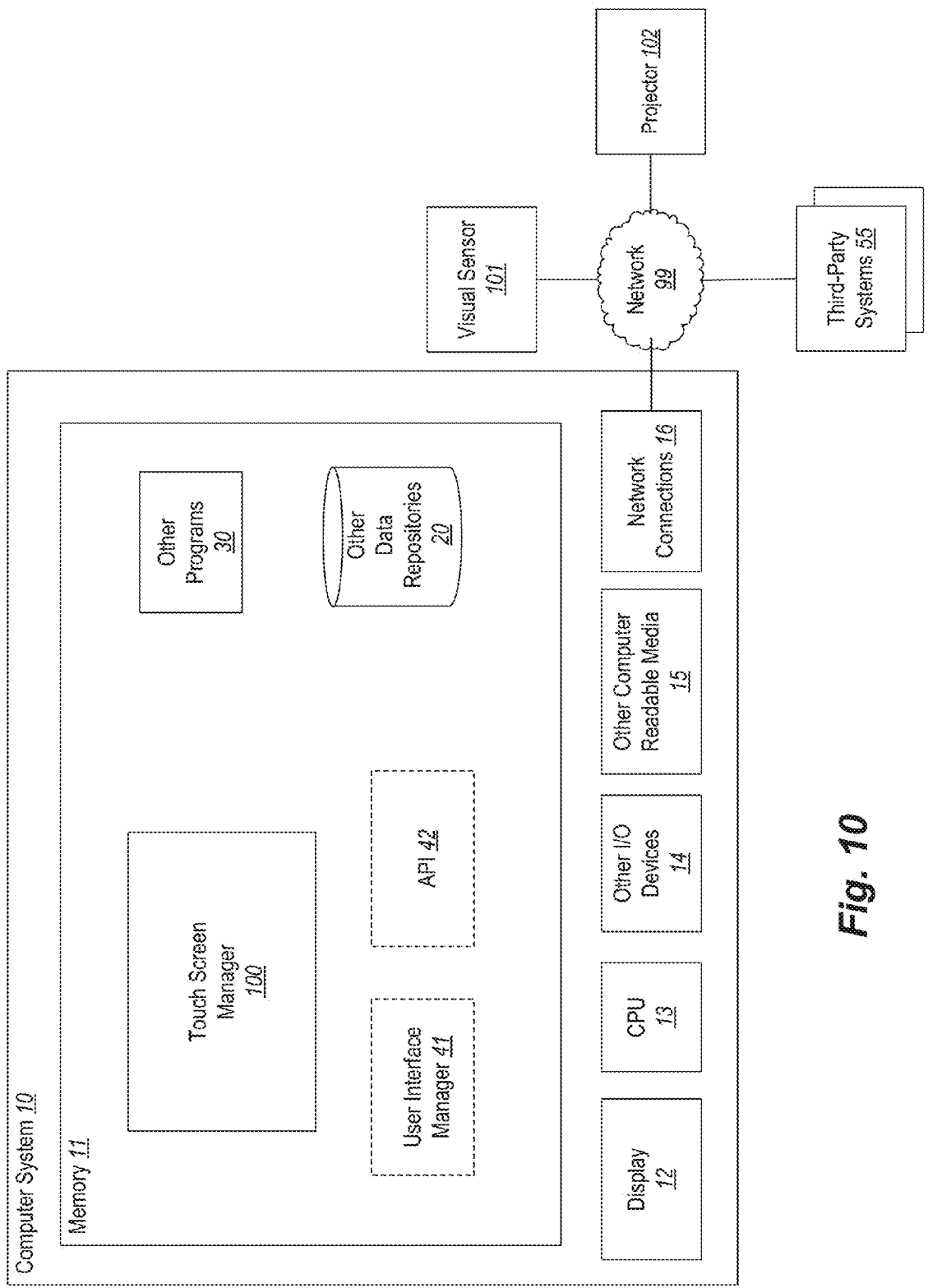
FIG. 10 is an example block diagram of an example computing system for implementing a touch screen manager according to an example embodiment.

FIG. 10 is an example block diagram of an example computing system for implementing a touch screen manager according to an example embodiment. In particular, FIG. 10 shows a computing system 10 that may be utilized to implement a TSM 100. Also, at least some of the implementation techniques described below with respect to the TSM 100 may be used to implement other devices, systems, or modules described herein.

Note that one or more general purpose or special purpose computing systems/devices may be used to implement the TSM 100. In addition, the computing system 10 may comprise one or more distinct computing systems/devices and may span distributed locations. Furthermore, each block shown may represent one or more such blocks as appropriate to a specific embodiment or may be combined with other blocks. Also, the TSM 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The TSM 100 is shown residing in memory 11. In other embodiments, some portion of the contents, some or all of the components of the TSM 100 may be stored on and/or transmitted over the other computer-readable media 15. The components of the TSM 100 preferably execute on one or more CPUs 13 and perform the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 4 may not be present in any specific implementation. For example, some embodiments may not provide other computer readable media 15 or a display 12.

The TSM 100 is shown executing in the memory 11 of the computing system 10. Also included in the memory are a user interface manager 41 and an application program interface ("API") 42. The user interface manager 41 and the API 42 are drawn in dashed lines to indicate that in other embodiments, functions performed by one or more of these components may be performed externally to the TSM 100.

The UI manager 41 provides a view and a controller that facilitate user interaction with the TSM 100 and its various components. For example, the UI manager 41 may provide interactive access to the TSM 100, such that users can interact with the TSM 100, such as during configuration and/or setup. In some embodiments, access to the functionality of the UI manager 41 may be provided via a Web server, possibly executing as one of the other programs 30. In such embodiments, a user operating a Web browser executing on one of the client devices 50 can interact with the TSM 100 via the UI manager 41.

The API 42 provides programmatic access to one or more functions of the TSM 100. For example, the API 42 may provide a programmatic interface to one or more functions of the TSM 100 that may be invoked by one of the other programs 30 or some other module. In this manner, the API 42 facilitates the development of third-party software, such as user interfaces, plug-ins, adapters (e.g., for integrating functions of the TSM 100 into Web applications), and the like.

In addition, the API 42 may be in at least some embodiments invoked or otherwise accessed via remote entities, such as code executing on one of the client devices 50, information sources 60, and/or one of the third-party systems/applications 55, to access various functions of the TSM 100. For example, the visual sensor 101 may push position information to the TSM 100 via the API 42. The API 42 may also be configured to provide management widgets (e.g., code modules) that can be integrated into the third-party applications 55 and that are configured to interact with the TSM 100 to make at least some of the described functionality available within the context of other applications (e.g., mobile apps).

The TSM 100 interacts via the network 99 with visual sensor 101, the projector 102, and third-party systems/applications 55. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 55 may include any systems that provide data to, or utilize data from, the TSM 100.

In an example embodiment, components/modules of the TSM 100 are implemented using standard programming techniques. For example, the TSM 100 may be implemented as a "native" executable running on the CPU 13, along with one or more static or dynamic libraries. In other embodiments, the TSM 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of or ancillary to the TSM 100, such as in the data store 20, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the TSM 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet are incorporated herein by reference, in their entireties.

While specific embodiments of the invention have been illustrated and described above, many changes can be made without departing from the spirit and scope of the invention. Accordingly, the scope of the invention is not limited by the disclosure of the above-described embodiments. Instead, the invention should be determined entirely by reference to the claims.

The invention claimed is:

1. A method comprising:
 managing user interaction in three dimensions with respect to a displayed user interface screen, by:
 displaying the user interface screen via a display device, wherein the user interface screen is displayed on a surface;
 performing a calibration process by:
 detecting position and orientation of the displayed user interface screen based on a pattern displayed onto the surface;
 detecting shape, size, and geometry of the surface on which the user interface screen is displayed; and
 building a three-dimensional model of the surface on which the user interface screen is displayed:
 receiving position information from a visual sensor, the position information reflecting the position of an object in a three-dimensional space located adjacent to the displayed user interface screen, wherein the three-dimensional space is located between the displayed user interface screen and the visual sensor;
 generating a user interface event based on the received position information; and
 providing the generated user interface event to an application program.

2. The method of claim 1, wherein the displaying the user interface screen includes: causing a projector to display the user interface screen on a wall, causing a display monitor to display the user interface screen, and/or displaying the user interface screen on a non-flat surface.

3. The method of claim 1, wherein the receiving position information from a visual sensor includes: receiving the position information from a range camera device, the position information including an x, y, z position of the object in the three-dimensional space.

4. The method of claim 1, wherein the generating a user interface event based on the received position information includes: generating a touch event that is one of a press, swipe, pinch, or expand.

5. The method of claim 1, wherein the generating a user interface event based on the received position information includes: generating a pointer mouse event that is one of a click, hover, select, or double-click.

6. The method of claim 1, wherein the generating a user interface event based on the received position information includes: generating an event based on multiple objects tracked in the three-dimensional space, the multiple objects including at least two fingers or two hands.

7. The method of claim 1, further comprising: presenting a setup user interface that instructs a user regarding one or more of: placement of the visual sensor, whether the display device is supported, whether the displayed screen is within range of the visual sensor, and whether lighting conditions are acceptable.

8. The method of claim 7, wherein the presenting a setup user interface includes: displaying an indication of a field of coverage of the visual sensor, so that the user can position the visual sensor at a location where the entire user interface screen is visible to the visual sensor.

9. The method of claim 7, wherein the presenting a setup user interface includes: instructing the user to reposition the visual sensor so that the visual sensor can support a selected interaction mode.

10. The method of claim 7, wherein the presenting a setup user interface includes: selecting a portion of the display to make interactive.

11. The method of claim 1,
 wherein the calibration process includes:
 detecting shape, size, and geometry of a surface on which the screen is displayed; and building a three-dimensional model of a non-flat surface on which the user interface screen is displayed.

12. The method of claim 1, wherein the calibration process includes: performing a two-step calibration process when a display surface is not visible to the visual sensor, by calibrating the display surface to the visual spectrum and then using a different object to perform background calibration.

13. The method of claim 1, wherein the calibration process includes: performing the calibration concurrently as a user is adjusting position of the visual sensor with respect to a display.

14. The method of claim 1, wherein the calibration process includes: performing a partial calibration by displaying a resizable object that is configured to be moved and resized by a user to define an area of the displayed user interface screen to make interactive.

15. The method of claim 1, wherein the calibration process includes:
   determining, based on the position of the visual sensor with respect to its display, that a current physical setup is substantially similar to a previously used physical setup; and
   in response to the detecting, performing auto-calibration without user input and/or skipping calibration and relying on calibration information determined with respect to the previously used physical setup.

16. The method of claim 1, further comprising: automatically selecting an interaction mode based on operating conditions, the operating conditions including one or more of current resolution, current lighting conditions, distance between the displayed user interface screen and the visual sensor, and an object being held by a user.

17. The method of claim 16, wherein the automatically selecting an interaction mode includes:
   selecting a finger-based interaction mode; and
   tracking a finger of a user by providing position information that reflects the position of the finger in the three-dimensional space.

18. The method of claim 16, wherein the automatically selecting an interaction mode includes:
   selecting a hand-based integration mode; and
   tracking a hand of a user by providing position information that reflects the position of the hand in the three-dimensional space.

19. The method of claim 16, wherein the automatically selecting an interaction mode includes:
   selecting a pen-based integration mode; and
   tracking a pen operated by a user by providing position information that reflects the position of the finger in the three-dimensional space.

20. The method of claim 1, wherein the receiving position information from a visual sensor includes: receiving position information that reflects the position of a pen device that includes a light source attached to a pressure sensitive tip, the tip when pressed configured to cause the light source to emit an infrared light signal that is tracked by the visual sensor.

21. The method of claim 20, wherein the pen includes a button that, when pressed, causes the light source to emit the infrared light signal.

22. The method of claim 20, wherein the light source is an infrared light emitting diode.

23. The method of claim 20, wherein the generating a user interface event based on the received position information includes: generating the user interface event based on the light signal emitted by the pen.

24. The method of claim 20, further comprising: switching interaction modes between pen-based interaction mode and hand/finger-based interaction mode.

25. The method of claim 24, wherein the switching interaction modes includes: automatically switching to the pen-based interaction mode when the pen is within a threshold distance of a surface on which the user interface screen is displayed, wherein the pen is configured to detect its proximity to the surface and send a message triggering the pen-based interaction mode.

26. The method of claim 24, wherein the switching interaction modes includes: switching modes in response to a user selection, the user selection including one of: a gesture, a wireless signal transmitted by the pen, a selection of a menu item displayed on the user interface screen.

27. The method of claim 1, further comprising:
   determining that a user interface event cannot be generated due to current conditions or action of the user; and
   in response, providing visual or audible feedback to a user to modify the condition or their action.

28. A non-transitory computer-readable medium including contents that are configured, when executed, to cause a computing system to perform a method comprising:
   managing user interaction in three dimensions with respect to a displayed user interface screen, by:
      displaying the user interface screen via a display device, wherein the user interface screen is displayed on a surface;
      performing a calibration process by:
         detecting position and orientation of the displayed user interface screen based on a pattern displayed onto the surface; and
         building a three-dimensional model of the surface on which the user interface screen is displayed;
      receiving position information from a visual sensor, the position information reflecting the position of an object in a three-dimensional space located adjacent to the displayed user interface screen, wherein the three-dimensional space is located between the displayed user interface screen and the visual sensor;
      generating a user interface event based on the received position information; and
      providing the generated user interface event to an application program.

29. A system comprising:
   a first computing device comprising a processor and a memory; and
   wherein the memory stores a code module that is configured, when executed by the processor, to manage user interaction in three dimensions with respect to a displayed user interface screen, by:
      displaying the user interface screen via a display device, wherein the user interface screen is displayed on a surface;
      performing a calibration process by:
         detecting position and orientation of the displayed user interface screen based on a pattern displayed onto the surface; and
         building a three-dimensional model of the surface on which the user interface screen is displayed;
      receiving position information from a visual sensor, the position information representing the position of an object in a three-dimensional space located adjacent to the displayed user interface screen, wherein the three-dimensional space is located between the displayed user interface screen and the visual sensor;

generating a user interface event based on the received position information; and providing the generated user interface event to an application program.

30. The system of claim 29, further comprising:

a second computing device that is a laptop or tablet computer that executes the application program; and wherein first computing device is configured to:
  wirelessly receive screen data from the first device;
  provide the screen data to the code module for display via the display device; and
  wirelessly transmit the generated user interface event to the second computing system.

31. The system of claim 29, wherein the display device is a projector that projects user interface screen onto the surface.

* * * * *